US012574091B2

(12) United States Patent
Geekie et al.

(10) Patent No.: US 12,574,091 B2
(45) Date of Patent: Mar. 10, 2026

(54) SOUNDING REFERENCE SIGNAL (SRS) TRANSMISSION IN DOWNLINK THROTTLING SCENARIO

(71) Applicant: QUALCOMM Incorporated, San Diego, CA (US)

(72) Inventors: James Francis Geekie, Carlsbad, CA (US); Alexei Yurievitch Gorokhov, San Diego, CA (US); Chun-Hao Hsu, San Jose, CA (US); Mahbod Ghelichi, San Diego, CA (US); Sivaram Srivenkata Palakodety, San Diego, CA (US); Pranay Sudeep Rungta, New York, NY (US); Krishna Chaitanya Mukkera, San Diego, CA (US); Adarsh Kumar Jinnu, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 18/548,004

(22) PCT Filed: Dec. 1, 2021

(86) PCT No.: PCT/US2021/072663
§ 371 (c)(1),
(2) Date: Aug. 25, 2023

(87) PCT Pub. No.: WO2022/240451
PCT Pub. Date: Nov. 17, 2022

(65) Prior Publication Data
US 2024/0146377 A1      May 2, 2024

(30) Foreign Application Priority Data

May 14, 2021      (IN) .............................. 202121021806

(51) Int. Cl.
*H04B 7/06*          (2006.01)
*H04B 7/0417*          (2017.01)
(Continued)

(52) U.S. Cl.
CPC ......... *H04B 7/0626* (2013.01); *H04B 7/0417* (2013.01); *H04L 5/0051* (2013.01); *H04L 5/006* (2013.01); *H04W 72/23* (2023.01)

(58) Field of Classification Search
CPC .... H04B 7/0626; H04B 7/0417; H04B 7/063; H04L 5/0051; H04L 5/006; H04L 5/0044;
(Continued)

(56) References Cited

U.S. PATENT DOCUMENTS 9,667,280 B2      5/2017   Shahidi et al.
2011/0243207 A1*   10/2011   Tang .................... H04B 7/0626
                                                    375/295
(Continued)

FOREIGN PATENT DOCUMENTS

CN      101868021 A  * 10/2010   ............ H04W 52/36
EP      2427001 A1      3/2012
(Continued)

OTHER PUBLICATIONS

Huawei, el al., "Other Considerations on UE Power Saving", 3GPP TSG RAN WG1 Meeting #98bis, 3GPP Draft, R1-1910079, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, 10 Pages, Oct. 5, 2019 (Oct. 5, 2019), XP051808417, Preferred MIMO configuration in p. 1.
(Continued)

*Primary Examiner* — Rownak Islam
(74) *Attorney, Agent, or Firm* — Harrity & Harrity, LLP \ Qualcomm

(57) ABSTRACT

This disclosure provides systems, methods and apparatuses for enabling downlink throttling, such as for thermal miti-
(Continued)

400 ➔

410
Channel
measurement

420
Transmit adjusted CSF
(and no SRS-AS).

430
Throttled downlink
transmissions.

120

110 gation. For example, a user equipment (UE) may transmit channel state feedback (CSF) with a report of a first rank that is less than a second rank associated with a channel condition and may communicate with a base station using a configuration associated with the first rank and without a set of sounding reference signals (SRSs). Alternatively, the UE may transmit one or more SRSs using a configuration associated with the first rank. In this way, by refraining from transmission of the SRSs or by adjusting the configuration the SRSs, the UE causes the base station to support downlink throttling.

30 Claims, 8 Drawing Sheets

(51) Int. Cl.
    *H04L 5/00*        (2006.01)
    *H04W 72/23*       (2023.01)
(58) Field of Classification Search
    CPC ................ H04L 5/0048; H04W 72/23; H04W
            52/0216; H04W 52/0245; H04W 52/0261;
            H04W 72/1273; H04M 2250/12; Y02D
                                                    30/70
    USPC ......................................................... 370/329
    See application file for complete search history.

(56)                      References Cited

U.S. PATENT DOCUMENTS

| | | | | | |
|---|---|---|---|---|---|
| 2016/0119942 | A1* | 4/2016 | Wang | ................ | H04W 72/1215 |
| | | | | | 370/336 |
| 2019/0094929 | A1* | 3/2019 | Geekie | .............. | H04W 52/0274 |

| | | | | | |
|---|---|---|---|---|---|
| 2020/0245333 | A1* | 7/2020 | Lin | ....................... | H04L 1/0026 |
| 2021/0168838 | A1* | 6/2021 | Kothiwale | .......... | H04W 72/569 |
| 2022/0060222 | A1* | 2/2022 | Tsai | ..................... | H04B 7/0417 |

FOREIGN PATENT DOCUMENTS

| | | |
|---|---|---|
| WO | 2012040510 | 3/2012 |
| WO | 2021227021 A1 | 11/2021 |

OTHER PUBLICATIONS

Huawei, et al., "UE Dynamic Adaptation to the Maximum Number of MIMO Layer", 3GPP TSG RAN WG1 Meeting #98bis, 3GPP Draft, R1-1910078, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, 5 Pages, Oct. 5, 2019 (Oct. 5, 2019), XP051788885, Section 2.2, Sections 2-3, the whole document.

International Search Report and Written Opinion—PCT/US2021/072663—ISA/EPO—Apr. 4, 2022.

Sony: "Discussion and Proposal to UE Overheat Issue for NR", 3GPP Draft, 3GPP TSG RAN WG2 Meeting #99, R2-1709515, Disc Paper Overheat_Sony_0.3 (003), 3rd Generation Partnership Project (3GPP), Mobile Competence Centre, 650, Route Des Lucioles, F-06921 Sophia-Antipolis Cedex, France, vol. RAN WG2, No. Berlin, Germany, Aug. 21, 2017-Aug. 25, 2017, Aug. 20, 2017 (Aug. 20, 2017), XP051319239, pp. 1-5.

Qualcomm Incorporated: "Adaptation of Maximum Number of MIMO Layers", 3GPP Draft, 3GPP TSG-RAN WG1 #99, R1-1912972, 3rd Generation Partnership Project (3GPP), Mobile Competence Centre, 650, Route Des 1 Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823734, 3 pages, the whole document.

* cited by examiner

110

410
Channel
measurement

420
Transmit adjusted CSF
(and no SRS-AS).

430
Throttled downlink
transmissions.

120

400

110

510
Channel
measurement

520
Transmit adjusted CSF.

530
Transmit adjusted SRS-AS.

540
Throttled downlink
transmissions.

120

500

610  Transmit channel state feedback with a report of a first rank that is less than a second rank associated with a channel condition.

620  Communicate with a base station using a configuration associated with the first rank and without transmitting a set of SRSs

600

710    Transmit channel state feedback with a report of a first rank that is less than a second rank associated with a channel condition.

720    Transmit a set of SRSs based on transmitting the channel state feedback with the report of the first rank.

700

US 12,574,091 B2

SOUNDING REFERENCE SIGNAL (SRS) TRANSMISSION IN DOWNLINK THROTTLING SCENARIO

CROSS-REFERENCE TO RELATED APPLICATIONS

This Patent Application is a 371 National Phase of PCT/US2021/072663, filed Dec. 1, 2021, entitled "SOUNDING REFERENCE SIGNAL (SRS) TRANSMISSION IN DOWNLINK THROTTLING SCENARIOS." and claims priority to India Patent Application No. 202121021806, filed on May 14, 2021, entitled "SOUNDING REFERENCE SIGNAL (SRS) TRANSMISSION IN DOWNLINK THROTTLING SCENARIOS," and assigned to the assignee hereof. The disclosure of the prior Applications are considered part of and are incorporated by reference into this Patent Application.

TECHNICAL FIELD

Aspects of the present disclosure relate generally to wireless communication and to techniques for sounding reference signal (SRS) transmission in downlink throttling scenarios.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include transmitting channel state feedback with a report of a first rank that is less than a second rank associated with a channel condition, and communicating with a base station using a configuration associated with the first rank and without a set of sounding reference signals (SRSs).

In some aspects, communicating with the base station includes receiving a grant of a set of physical downlink shared channel (PDSCH) resources associated with the configuration and without the set of SRSs. In some aspects, the method may include refraining from transmission of the set of SRSs based on transmitting the channel state feedback with the report of the first rank. In some aspects, the method may include measuring one or more signals, associated with the second rank, on a channel; and generating channel state feedback including the first rank based on measuring the one or more signals. In some aspects, the method may include receiving an indication that a temperature threshold is satisfied, and transmitting the channel state feedback with the report of the first rank may include transmitting the channel state feedback with the report of the first rank based on receiving the indication that the temperature threshold is satisfied. In some aspects, the temperature threshold is associated with a junction temperature or a skin temperature. In some aspects, the set of SRSs is a set of antenna-switching SRSs (AS-SRSs).

Another innovative aspect of the subject matter described in this disclosure can be implemented in an apparatus of a UE for wireless communication. The apparatus may include a first interface to output channel state feedback with a report of a first rank that is less than a second rank associated with a channel condition. The apparatus may include the first interface or a second interface to communicate with a base station using a configuration associated with the first rank and without an set of SRSs.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to transmit channel state feedback with a report of a first rank that is less than a second rank associated with a channel condition, and communicate with a base station using a configuration associated with the first rank and without a set of SRSs.

Another innovative aspect of the subject matter described in this disclosure can be implemented in an apparatus for wireless communication. The apparatus may include means for transmitting channel state feedback with a report of a first rank that is less than a second rank associated with a channel condition, and means for communicating with a base station using a configuration associated with the first rank and without a set of SRSs.

In some aspects, the apparatus of the UE, such as a processing system of the apparatus or one or more interfaces of the apparatus, among other examples, may be configured to perform one or more operations of the method of wireless communication performed by the apparatus.

Another innovative aspect of the subject matter described in this disclosure can be implemented in a method of wireless communication performed by an apparatus of a UE. The method may include transmitting channel state feedback with a report of a first rank that is less than a second rank associated with a channel condition; and transmitting a set of SRSs using a configuration associated with the first rank.

In some aspects, the method may include communicating with a base station using the configuration associated with the first rank. In some aspects, communicating with the base station includes receiving a grant of a set of PDSCH resources associated with the configuration. In some aspects, the configuration includes a quantity of configured SRS resources on which the set of SRSs is transmitted.

In some aspects, the method may include measuring one or more signals, associated with the second rank, on a channel, and generating channel state feedback including the first rank based on measuring the one or more signals. In some aspects, the method may include receiving an indication that a temperature threshold is satisfied; and transmitting the channel state feedback may include transmitting the channel state feedback based on receiving the indication of that the temperature threshold is satisfied. In some aspects, the temperature threshold is associated with a junction temperature or a skin temperature. In some aspects, transmitting the set of SRSs includes transmitting the set of SRSs using one or more configured SRS resources based on receiving the indication that a temperature threshold is satisfied. In some aspects, the set of SRSs is a set of AS-SRSs.

Another innovative aspect of the subject matter described in this disclosure can be implemented in an apparatus of a base station for wireless communication. The apparatus may include a first interface to output channel state feedback with a report of a first rank that is less than a second rank associated with a channel condition. The apparatus may include the first interface to transmit a set of SRSs using a configuration associated with the first rank.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a base station, may cause the one or more processors to transmit channel state feedback with a report of a first rank that is less than a second rank associated with a channel condition; and transmit a set of SRSs using a configuration associated with the first rank.

Another innovative aspect of the subject matter described in this disclosure can be implemented in an apparatus for wireless communication. The apparatus may include means for means for transmitting channel state feedback with a report of a first rank that is less than a second rank associated with a channel condition; and means for transmitting a set of SRSs using a configuration associated with the first rank.

In some aspects, the apparatus of the UE, such as a processing system of the apparatus or one or more interfaces of the apparatus, among other examples, may be configured to perform one or more operations of the method of wireless communication performed by the apparatus.

Details of one or more implementations of the subject matter described in this disclosure are set forth in the accompanying drawings and the description. Other features, aspects, and advantages will become apparent from the description, the drawings and the claims Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
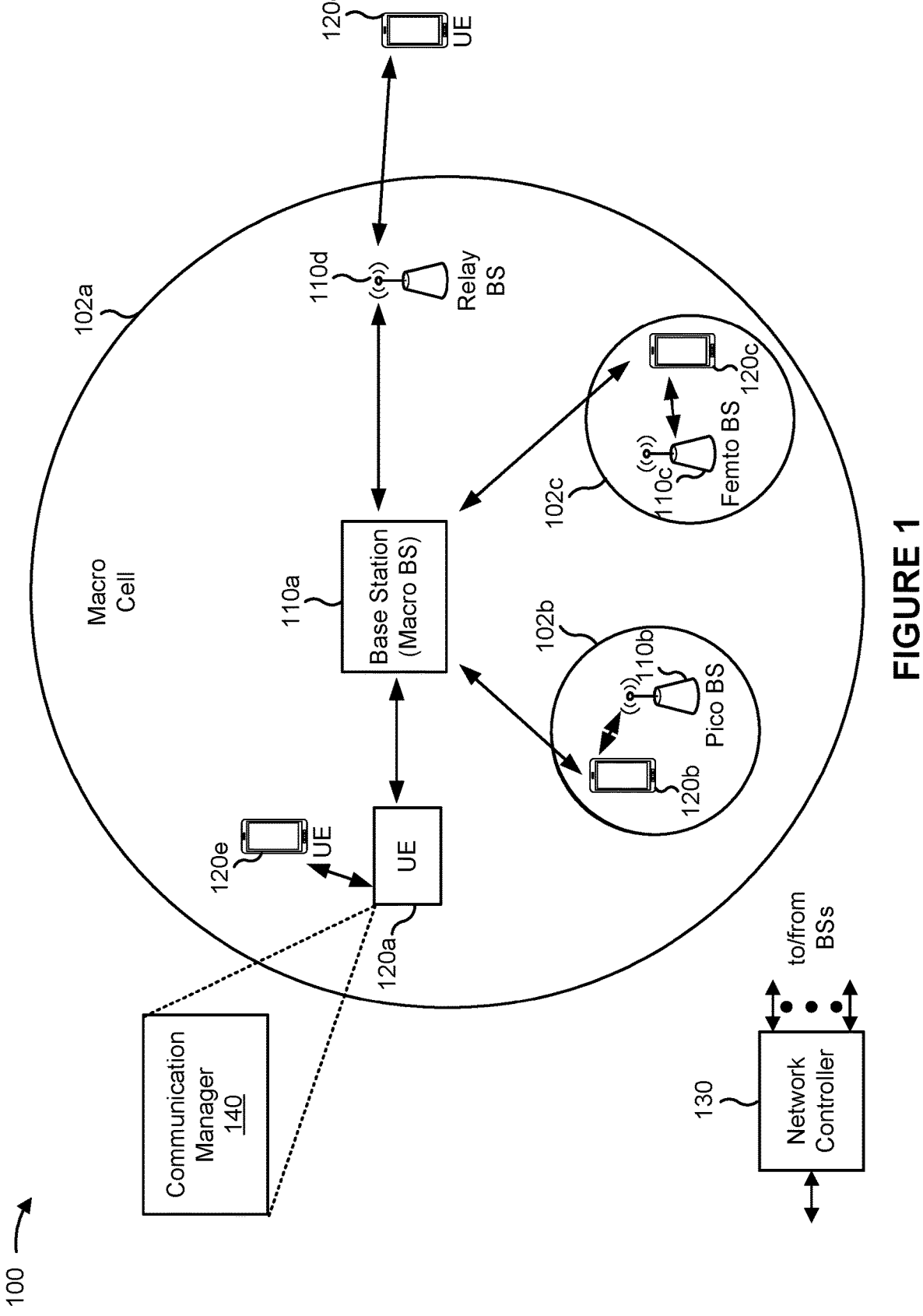
FIG. 1 is a diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards However, the described implementations may be implemented in any device, system or network that is capable of transmitting and receiving radio frequency signals according to any of the wireless communication standards, including, for example any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G technology, 4G technology, 5G technology, or further implementations thereof.

Power consumption, by a user equipment (UE), may result in thermal management issues. When a UE is using a relatively high amount of power, such as operating at or above a threshold power level for at or above a threshold duration of time, temperatures associated with the UE may exceed safe operating temperatures. For example, when operating in a first frequency range (FR1), which may span from 410 MHz to 7.125 GHz, a UE may experience an excessive junction temperature ($T_j$), such as greater than 95 degrees Celsius (° C.), or an excessive skin temperature ($T_{skin}$), such as greater than 43° C. An excess junction temperature may result in a negative impact to a modem baseband or a radio frequency (RF) transceiver, such as reduced performance or increased likelihood of part failure. Similarly, an excess skin temperature may render operation of the UE to be dangerous or result in an increased likelihood of damage to the UE.

To avoid thermal management issues, a base station and a UE may use downlink throttling procedures. By throttling a downlink, the UE may reduce a power consumption at the modem baseband or at an application processor of the UE, thereby reducing a temperature of the UE, such as a junction temperature or a skin temperature. A downlink throughput may be based on a UE report of a rank or a channel quality indicator (CQI). One technique for downlink throttling is to adjust CQI. For example, the UE may identify a first CQI associated with a channel condition, but the UE may report a second CQI that is not associated with the channel condition and indicates a channel quality that is worse than the channel condition. In this case, the base station may select a modulation and coding scheme (MCS) based on the second CQI and the channel quality that is worse than the channel condition. A result of selecting the MCS based on the second CQI is that the selected MCS may throttle downlink communication.

As another technique to enable downlink throttling, the UE may report a first rank, that is different from (lower than) a measured, higher second rank, to the base station. In this way, the UE causes the base station to select the first rank for downlink transmission, thereby throttling the downlink. For example, the UE may measure rank two (2) (the second, higher rank), but report rank one (1) (the first, lower rank) to the base station to cause the base station to select a configuration, for the downlink transmission, that corresponds to rank 1 rather than rank 2. A rank may correspond to an antenna configuration that the UE requests, in a report, to use for communication. For example, when a UE has two antennas, the UE may measure a signal to interference and noise ratio (SINR) on the two antennas and report rank one (1) to indicate a good (at or above a threshold) SINR on one antenna and rank two (2) to indicate a good SINR on both antennas. Similarly, when the UE has other quantities of antennas (for example, four (4) or eight (8)), the UE can report additional ranks to indicate a quantity of antennas with a good SINR.

Based on the reported rank, the base station may schedule a downlink on the quantity of antennas for which the UE reports good SINR. Using greater quantities of antennas generally results in greater power consumption and greater heat generation (for example, resulting in a need for greater heat dissipation), thus, a UE may artificially reduce a rank (for example, from a measured rank of 2 to an adjusted rank of 1) to cause the base station to schedule downlink transmission on fewer antennas (transmission using, for example, fewer multiple-input, multiple-output (MIMO) layers) and reduce power consumption and heat dissipation. Reducing a quantity of transmit antennas and associated MIMO layers may provide further reduction to power consumption and heat dissipation than is achieved with MCS adjustment alone. Alternatively, a UE and a base station may reduce the quantity of transmit antennas and associated MIMO layers without artificially adjusting a CQI and MCS.

However, when antenna switching (AS) sounding reference signal (SRS) (SRS-AS) transmission is enabled, the base station can derive the rank and associated channel condition, for example, from one or more SRS-AS transmissions. Some base stations may select a rank and schedule downlink transmission, for example, on a selected quantity of antennas based on deriving the rank and associated channel condition from one or more SRS-AS transmissions rather than from the rank reported by the UE in channel state feedback (CSF), which may include a CQI, a rank indicator (RI), or a precoding matrix indicator (MI), among other examples. For example, a UE may report an adjusted rank of 2 (to indicate 2 antennas with a good SINR, despite the UE having 3 or 4 antennas with a good SINR) using channel state feedback during downlink throttling and may transmit SRS-AS transmissions with 4 antennas (transmitting on 1 antenna at a time or 2 antennas at a time). In this case, a base station may schedule the UE with 3 or 4 layer physical downlink shared channel (PDSCH) grants based on the SRS-AS transmissions (and a base station determination that 3 or 4 antennas have a good SINR) rather than, for example, 1 or 2 layer PDSCH grants based on the channel state feedback. A quantity of layers of a PDSCH grant may correspond to a quantity of transmit antennas that a base station is to use (and a corresponding quantity of receive antennas that a UE is to use) for communication. Although the UE reports a lower, adjusted rank to cause downlink throttling for thermal mitigation, the base station may fail to select a transmission configuration corresponding to the lower rank (a 1 or 2 layer PDSCH grant) and may, instead, select a configuration corresponding to the higher rank (a 3 or 4 layer PDSCH grant) based on SRS-AS transmissions.

Some aspects described herein enable downlink throttling, such as for thermal mitigation, when a UE is configured for SRS-AS transmission. For example, a UE may transmit a CSF report identifying an adjusted rank that is lower than a measured rank corresponding to a channel condition and may refrain from transmitting one or more SRS-AS transmissions (although the UE is configured for SRS-AS transmission). In this way, based on refraining from transmitting one or more SRS-AS transmissions, the UE causes the base station to determine a configuration based on a CSF report, which includes the adjusted rank. Alternatively, the UE may transmit one or more SRS-ASs using a quantity of SRS resources selected based on the adjusted rank rather than a quantity of SRS resources selected based on a measured rank. In this case, if the base station selects a configuration based on the quantity of SRS resources used for SRS-AS transmission (a quantity of antennas on which the SRS-AS is transmitted), the base station can select the same configuration as would be selected based on the CSF report. In this way, by adjusting the quantity of SRS resources used for SRS-AS transmission, the UE causes the base station to support downlink throttling.

Particular implementations of the subject matter described in this disclosure can be implemented to realize one or more of the following potential advantages. For example, by ensuring that a base station selects a configuration corresponding to the adjusted rank, the UE ensures that downlink throttling may be enabled even when a base station is configured to select a configuration based on a measurement of one or more SRS-AS transmissions. In this way, the UE reduces a likelihood of exceeding a temperature limitation, thereby reducing a likelihood of damage to the UE or reduced performance by the UE. Additionally, or alternatively, by using downlink throttling to reduce a power consumption, the UE may enable improved battery life (such as when a battery of the UE has less than a threshold amount of charge). Further, the UE and the base station may use rank reduction in combination with CQI adjustment to achieve greater downlink throttling and associated power consumption reduction than can be achieved with CQI adjustment alone. Alternatively, the UE and the base station may use rank reduction without CQI adjustment, thereby enabling downlink throttling and associated power consumption reduction without artificially changing an MCS. By avoiding artificially changing an MCS, the UE may enable use of an MCS suited to an actual channel condition, thereby improving communication performance relative to using a CQI adjustment technique to artificially change the MCS.

FIG. 1 is a diagram illustrating an example of a wireless network 100. The wireless network 100 may be or may include elements of a 5G (for example, NR) network or a 4G (for example, LTE) network, among other examples. The wireless network 100 may include one or more base stations 110 (shown as a BS 110*a*, a BS 110*b*, a BS 110*c*, and a BS 110*d*), a UE 120 or multiple UEs 120 (shown as a UE 120*a*, a UE 120*b*, a UE 120*c*, a UE 120*d*, and a UE 120*e*), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (for example, three) cells.

In some examples, a cell may not necessarily be stationary, and the geographic area of the cell may move according to the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110*d* (for example, a relay base station) may communicate with the BS 110*a* (for example, a macro base station) and the UE 120*d* in order to facilitate communication between the BS 110*a* and the UE 120*d*. A base station 110 that relays communications may be referred to as a relay station, a relay base station, or a relay.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network

100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may transmit channel state feedback with a report of a first rank that is less than a second rank associated with a channel condition; and communicate with a base station using a configuration associated with the first rank and without a set of SRSs. Additionally, or alternatively, the communication manager 140 may transmit channel state feedback with a report of a first rank that is less than a second rank associated with a channel condition; and transmit a set of SRSs using a configuration associated with the first rank. Additionally, or alternatively, the communication manager 140 may perform one or more other operations described herein.

Figure 2:
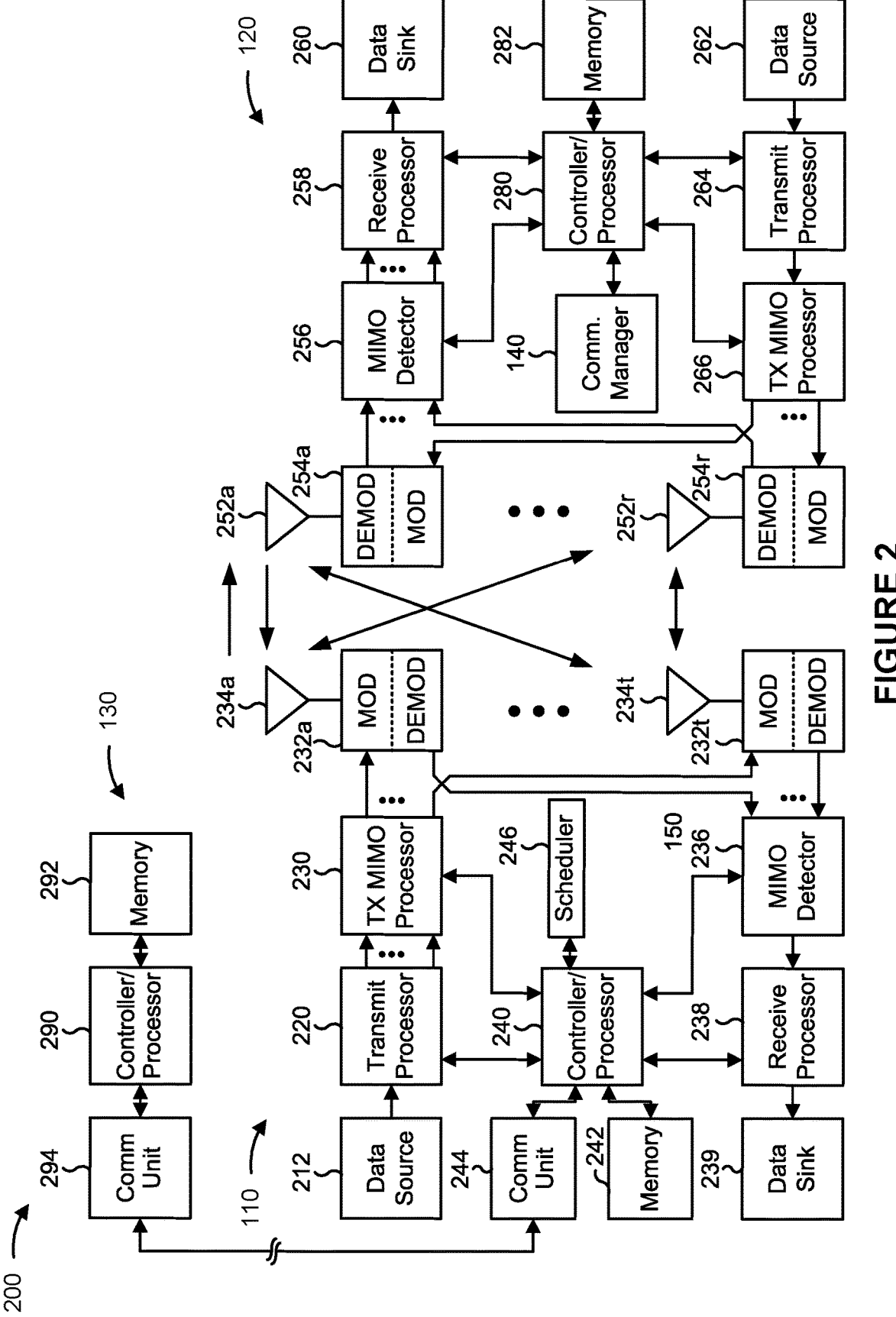
FIG. 2 is a diagram illustrating an example of a base station in communication with a user equipment (UE) in a wireless network.

FIG. 2 is a diagram illustrating an example 200 of a base station 110 in communication with a UE 120 in a wireless network 100. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more MCSs for the UE 120 using one or more CQIs received from that UE 120. The base station 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) MIMO processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the base station 110 or other base stations 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink

239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein.

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

The controller/processor 240 of the base station 110, the controller/processor 280 of the UE 120, or any other component(s) of FIG. 2 may perform one or more techniques associated with SRS transmission in downlink throttling scenarios, as described in more detail elsewhere herein. For example, the controller/processor 240 of the base station 110, the controller/processor 280 of the UE 120, or any other component(s) (or combinations of components) of FIG. 2 may perform or direct operations of, for example, process 600 of FIG. 6, process 700 of FIG. 7, or other processes as described herein. The memory 242 and the memory 282 may store data and program codes for the base station 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 600 of FIG. 6, process 700 of FIG. 7, or other processes as described herein. In some examples, executing instructions may include running the instructions, converting the instructions, compiling the instructions, or interpreting the instructions.

In some aspects, a UE includes means for transmitting channel state feedback with a report of a first rank that is less than a second rank associated with a channel condition; or means for communicating with a base station using a configuration associated with the first rank and without a set of SRSs; or a combination thereof. In some aspects, the UE includes means for transmitting channel state feedback with a report of a first rank that is less than a second rank associated with a channel condition; or means for transmitting a set of SRSs using a configuration associated with the first rank; or a combination thereof. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 3:
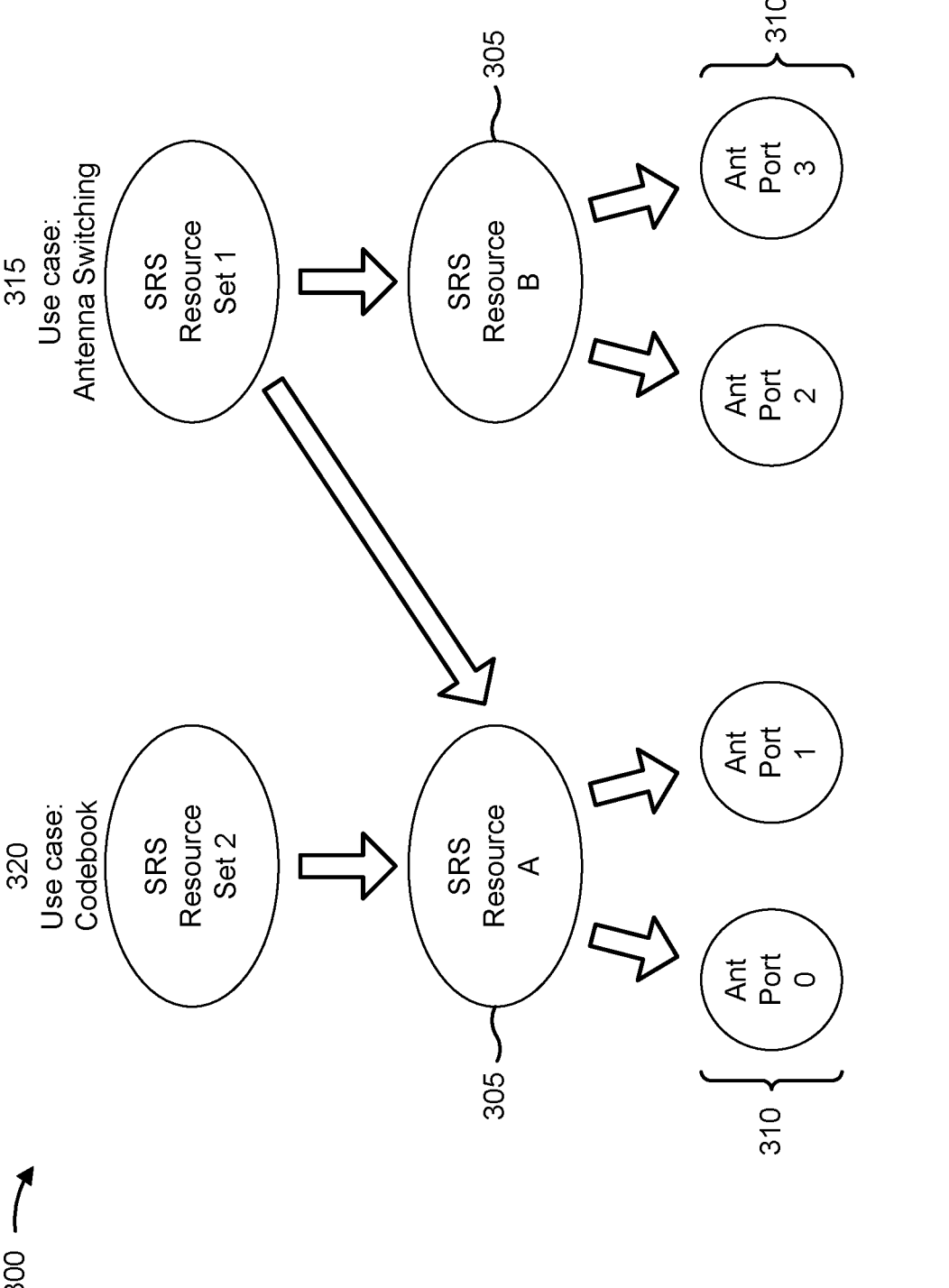
FIG. 3 is a diagram illustrating an example of sounding reference signal (SRS) resource sets.

FIG. 3 is a diagram illustrating an example 300 of SRS resource sets.

A base station 110 (such as the base station 110 depicted in, and described in connection with, FIGS. 1 and 2) may configure a UE 120 (such as the UE 120 depicted in, and described in connection with FIGS. 1 and 2) with one or more SRS resource sets to allocate resources for SRS transmissions by the UE 120. For example, a configuration for SRS resource sets may be indicated in a radio resource control (RRC) message, such as an RRC configuration message or an RRC reconfiguration message. As shown by reference number 305, an SRS resource set may include one or more resources (shown as SRS resources), which may include time resources or frequency resources, such as a slot, a symbol, a resource block, or a periodicity for the time resources.

As shown by reference number 310, an SRS resource may include one or more antenna ports of the UE 120 on which an SRS is to be transmitted in a time-frequency resource. Thus, a configuration for an SRS resource set may indicate one or more time-frequency resources in which an SRS is to be transmitted and may indicate one or more antenna ports on which the SRS is to be transmitted in those time-frequency resources. The configuration for an SRS resource set may indicate a use case, such as in an SRS-SetUse information element, for the SRS resource set. For example, an SRS resource set may have a use case of antenna switching, codebook, non-codebook, or beam management. In an antenna switching use case, an SRS transmission may be an SRS-AS transmission.

An antenna switching SRS resource set may be used to indicate downlink channel state information (CSI) with reciprocity between an uplink and downlink channel. For example, when there is reciprocity between an uplink channel and a downlink channel, a base station 110 may use an antenna switching SRS (an SRS transmitted using a resource of an antenna switching SRS resource set) to acquire downlink CSI (to determine a downlink precoder to be used to communicate with the UE 120). The base station 110 may determine a rank for the downlink precoder based on a quantity of SRS resources used for transmission of an antenna switching SRS. A codebook SRS resource set may be used to indicate uplink CSI when a base station 110 indicates an uplink precoder to the UE 120. A non-codebook SRS resource set may be used to indicate uplink CSI when the UE 120 selects an uplink precoder. A beam management SRS resource set may be used for indicating CSI for millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (a slot-level periodicity, where the SRS resources occurs every Y slots) and a slot offset. A semi-persistent SRS resource may be configured via a configuration message that indicates a periodicity and a slot offset for the semi-persistent SRS resource. A semi-persistent SRS may be dynamically activated and using downlink control information (DCI) or a medium access control (MAC) control element (CE) (MAC-CE). An aperiodic SRS resource may be triggered dynamically, such as via DCI (UE-specific DCI or group common DCI) or a MAC-CE.

In some aspects, the UE 120 may be configured with a mapping between SRS ports (ports that are or are to be used for SRS communication) and corresponding SRS resources. The UE 120 may transmit an SRS on a particular SRS resource using an SRS port indicated in the configuration. In some aspects, an SRS resource may span N adjacent symbols within a slot (where N equals 1, 2, or 4). The UE 120 may be configured with X SRS ports (where X≤4). In some aspects, each of the X SRS ports may mapped to a corresponding symbol of the SRS resource and used for transmission of an SRS in that symbol.

As shown in FIG. 3, in some aspects, different SRS resource sets indicated to the UE 120 (having different use cases) may overlap (in time or in frequency, such as in the same slot). For example, as shown by reference number 315, a first SRS resource set (shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (a first time-frequency resource) using antenna port 0 and antenna port 1 and may be transmitted in SRS Resource B (a second time-frequency resource) using antenna port 2 and antenna port 3. A base station 110 may derive a rank for a subsequent communication based on a quantity of SRS resources used for transmitting the antenna switching SRS.

As shown by reference number 320, a second SRS resource set (shown as SRS Resource Set 2) may be a codebook use case. As shown, this example codebook SRS resource set includes only the first SRS resource (shown as SRS Resource A). Thus, codebook SRSs may be transmitted in SRS Resource A (the first time-frequency resource) using antenna port 0 and antenna port 1. In this case, the UE 120 may not transmit codebook SRSs in SRS Resource B (the second time-frequency resource) using antenna port 2 and antenna port 3.

Figure 4:
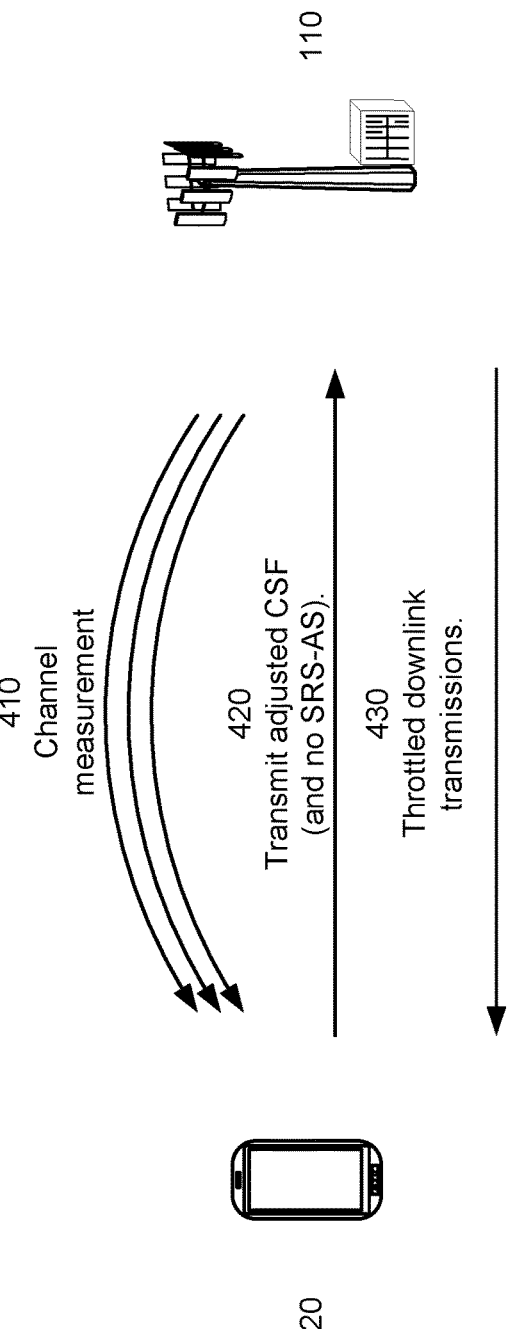
FIGS. 4 and 5 are diagrams illustrating examples associated with SRS transmission in downlink throttling scenarios.

FIG. 4 is a diagram illustrating an example 400 associated with SRS transmission in downlink throttling scenarios. As shown in FIG. 4, example 400 includes communication between a base station 110 (such as the base station 110 depicted or described in connection with FIGS. 1-3) and a UE 120 (such as the UE 120 depicted or described in connection with FIGS. 1-3). In some aspects, the base station 110 and the UE 120 may be included in a wireless network, such as wireless network 100. The base station 110 and the UE 120 may communicate via a wireless access link, which may include an uplink link and a downlink link.

As further shown in FIG. 4, and by reference number 410, the UE 120 may receive a set of signals and perform one or more channel measurements. For example, the UE 120 may measure a channel congestion level, an RSRP, an RSRQ, or a CQI. Based on performing the one or more channel measurements, the UE 120 may determine, identify, or assign a rank for the channel. For example, the UE 120 may determine a measured rank to report, such as rank 1, rank 2, or rank 3, among other examples. The measured rank, which the UE 120 may be configured to report in channel state feedback, may be a rank for the channel determined based on the measurements. The UE may determine the measured rank based on channel measurements or based on received signals identifying results of channel measurements.

As further shown in FIG. 4, and by reference number 420, the UE 120 may transmit adjusted channel state feedback and refrain from transmitting SRS, such as an SRS-AS. For example, the UE 120 may alter the measured rank to generate an adjusted rank (which is less than the measured rank) and may transmit channel state feedback identifying the adjusted rank. In this case, the adjusted rank, which is reported in the channel state feedback, is less than the measured rank that is determined based on the one or more channel measurements. The channel state feedback may include a rank indicator identifying the adjusted rank (rather than a rank indicator identifying the measured rank). To avoid a mismatch between a base station 110 configuration determination based on the adjusted rank and a base station 110 configuration determination based on monitoring for SRS transmissions (for example an, SRS-AS transmissions), the UE 120 refrains from transmitting SRS transmissions. For example, the adjusted rank may correspond to a first quantity of layers for PDSCH transmission (a throttled downlink transmission scenario) and a result of monitoring for SRS transmissions (for example an SRS-AS transmission) may correspond to a second, higher quantity of layers for PDSCH transmission (a non-throttled downlink transmission scenario). In this case, to ensure that the base station 110 configures a throttled downlink transmission scenario, the UE 120 refrains from transmitting SRS transmissions to prevent the base station 110 from configuring, for example, the second, higher quantity of layers for PDSCH transmission.

In some aspects, the UE 120 communicates with the base station 110 using a configuration based on the adjusted rank without an SRS transmission. For example, when the UE 120 refrains from transmitting one or more SRS transmissions (for example, one or more SRS-AS transmissions), the UE 120 may receive a grant associated with a PDSCH and may receive a PDSCH without an SRS transmission (for example, an SRS-AS transmission) occurring between transmission of the channel state feedback and receiving the grant or the PDSCH.

Communicating based on the adjusted rank and without an (intervening) SRS transmission may include communicating without the UE 120 having transmitted an SRS transmission (for example, an intervening SRS transmission) between the UE transmitting the channel state feedback and a period at which the base station 110 configures a throttled downlink transmission scenario. In other words, when the UE 120 refrains from transmitting a specific SRS transmission, at a time when the UE 120 would have transmitted the specific SRS transmission, in order to ensure that base station 110 configures a throttled downlink scenario, and the base station 110 does configure a throttled downlink scenario based on channel state feedback and not based on the specific SRS transmission (which was not transmitted), the UE 120 may be communicating with the base station 110 using a configuration based on the adjusted rank and without (transmitting) an SRS.

In some aspects, the UE 120 may adjust the channel state feedback based on detecting a condition associated with downlink throttling. For example, when the UE 120 detects, identifies, or determines that a temperature value, such as a junction temperature or a skin temperature, exceeds or satisfied a threshold (for example, a temperature threshold), the UE 120 may enable downlink throttling to avoid further or subsequent excess temperature readings. Additionally, or alternatively, the UE 120 may detect, identify, or determine that a threshold power level has been exceeded or a threshold duration (for example, for the threshold temperature value or the threshold power level) has been exceeded, among other examples. In these cases, the UE 120 may adjust a measured rank (determined based on the one or more channel measurements) to generate an adjusted rank (that is lower than the measured rank), which the UE 120 may report to the base station 110 in channel state feedback. For example, when the UE 120 measures a channel and determines a measured rank of three (3), the UE 120 may transmit channel state feedback identifying an adjusted rank of two (2), to cause the base station 110 to throttle a downlink by selecting a configuration based on the adjusted rank of 2 rather than the measured rank of 3. In some cases, the UE 120 may refrain from measuring a channel when a threshold criteria (for example, the threshold temperature value, the threshold power level, or the threshold duration) has been satisfied. For example, when the UE 120 determines that the threshold criteria has been satisfied, the UE 120 may refrain from performing a channel measurement and may use a default rank as the adjusted rank for reporting to the base station 110 to cause the base station 110 to throttle a downlink.

In some aspects, the UE 120 may transmit channel state feedback with a rank indicator associated with the adjusted rank (rather than the measured rank) and with an adjusted CQI. For example, the UE 120 may transmit channel state feedback identifying the adjusted rank to cause a change to a quantity of transmission antennas and MIMO layers used by the base station 110 and the adjusted CQI to cause a change to an MCS used by the base station 110. Although some aspects are described in terms of adjusting a rank in channel state feedback to cause the base station to throttle a downlink, other possible parameter adjustments are contemplated. In some aspects, the UE 120 may transmit channel state feedback with a rank indicator associated with the adjusted rank (rather than the measured rank) and without an adjusted CQI. For example, the UE 120 may transmit channel state feedback identifying the adjusted rank to cause a change to a quantity of transmission antennas and MIMO layers used by the base station 110 and without an adjusted CQI to avoid a change to an MCS used by the base station 110.

As further shown in FIG. 4, and by reference number 430, the base station 110 may transmit, to the UE 120 on a downlink, a set of throttled downlink transmissions. For example, based on receiving the adjusted rank in the channel state feedback and not receiving any SRSs (for example, one or more SRS-ASs), the base station 110 may determine or otherwise select a configuration based on the adjusted rank. In this case, the configuration may be a quantity of layers for PDSCH grants. For example, the base station 110 may configure 2 layer PDSCH grants and may transmit 2 layer PDSCH communications based on the adjusted rank rather than configuring 3 layer PDSCH grants based on the measured rank. In other words, based on the adjusted rank being less than the measured rank, the downlink transmissions using a configuration based on the adjusted rank are throttled relative to if a configuration for the downlink transmissions was based on the measured rank. In some aspects, the base station 110 may configure an MCS based on an adjusted CQI and transmit using a quantity of antennas associated with the adjusted rank and an adjusted MCS based on the adjusted CQI. In some aspects, the base station 110 may configure an MCS based on a CQI that is not adjusted and transmit using a quantity of antennas associated with the adjusted rank and without an adjusted MCS.

Figure 5:
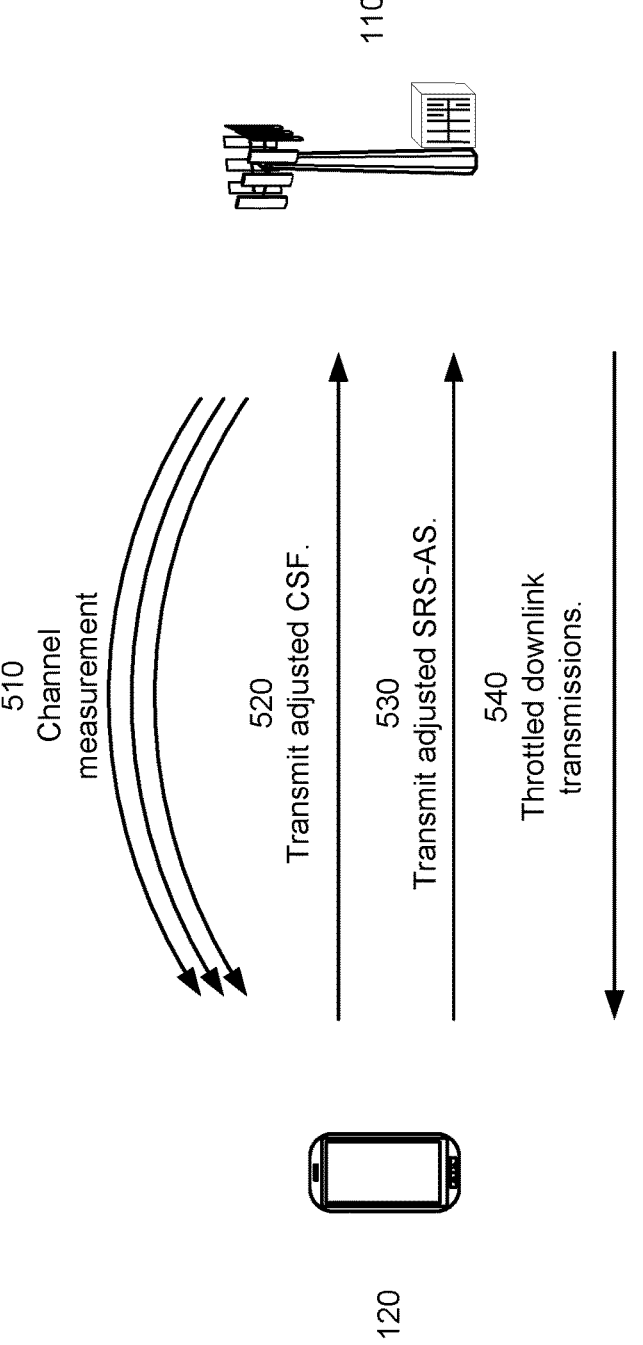

FIG. 5 is a diagram illustrating an example 500 associated with SRS transmission in downlink throttling scenarios. As shown in FIG. 5, example 500 includes communication between a base station 110 (such as the base station 110 depicted in or described in connection with FIGS. 1-4) and a UE 120 (such as the UE 120 depicted in or described in connection with FIGS. 1-3). In some aspects, the base station 110 and the UE 120 may be included in a wireless network, such as wireless network 100. The base station 110 and the UE 120 may communicate via a wireless access link, which may include an uplink link and a downlink link.

As further shown in FIG. 5, and by reference number 510, the UE 120 may receive a set of signals and perform one or more channel measurements. For example, the UE 120 may measure a channel congestion level, an RSRP, an RSRQ, or a CQI. Based on performing the one or more channel measurements, UE 120 may determine a rank for the channel. For example, the UE 120 may determine, identify, or assign a measured rank to the channel, such as rank 1, rank 2, or rank 3, among other examples.

As further shown in FIG. 5, and by reference numbers 520 and 530, the UE 120 may transmit adjusted channel state feedback and an adjusted SRS (for example, an SRS-AS). For example, the UE 120 may transmit channel state feedback identifying an adjusted rank that is less than the measured rank. In this case, to avoid a mismatch between a base station 110 configuration determination associated with the channel state feedback and a base station 110 configuration determination associated with monitoring for SRS transmissions, the UE 120 may adjust a quantity of resources used for SRS transmissions. For example, rather than transmitting the SRS transmission using a quantity of resources corresponding to the measured rank, the UE 120 may transmit the SRS transmission (for example, SRS-AS transmission) using a quantity of resources corresponding to the adjusted rank. As a particular non-limiting example, when the UE 120 is reporting an adjusted rank of two (2) in channel state feedback (rather than a measured rank of four (4)), the UE 120 may transmit the SRS using 2 antennas (rather than 4 antennas). In this case, the base station 110 may receive signals on 2 antennas and may determine, identify, or assign a rank of 2 to a channel. As another particular example, when the UE 120 is reporting an adjusted rank of one (1) in channel state feedback, the UE 120 may transmit the SRS using 1 antenna. When the base station 110 selects a configuration based on the one or more SRS transmissions, (e.g., SRS-AS transmissions), the base station 110 is caused to select a configuration that is the same as a configuration based on the adjusted rank (rather than a configuration corresponding to the measured rank), thereby achieving downlink throttling, avoiding block error rate (BLER), or radio link failure (RLF), among other examples.

In some aspects, the UE 120 may adjust the channel state feedback and the SRS transmission resources based on detecting a condition associated with downlink throttling. For example, when the UE 120 detects, identifies, or determines that a temperature value, such as a junction temperature or a skin temperature, exceeds a threshold, the UE 120 may enable downlink throttling to avoid further or subsequent excess temperature readings. In this case, the UE 120 may adjust a measured rank to generate an adjusted rank and may adjust a quantity of SRS resources used to correspond to the adjusted rank rather than the measured rank.

In some aspects, the UE 120 may transmit the adjusted channel state feedback and the adjusted SRS using one or more communications. For example, the UE 120 may transmit the adjusted channel state feedback in a sequentially first communication and the adjusted SRS in a sequentially second communication. Alternatively, the UE 120 may transmit the adjusted SRS in a sequentially first communication and the adjusted channel state feedback in a sequentially second communication. Alternatively, the UE 120 may transmit the adjusted channel state feedback and the adjusted SRS in a concurrent, separate communications. Alternatively, the UE 120 may transmit the adjusted channel state feedback and the adjusted SRS in a single communication.

As further shown in FIG. 5, and by reference number 540, the base station 110 may transmit, to the UE 120, on a downlink a set of throttled downlink transmissions. For example, the base station 110 may determine a configuration (a quantity of layers for a PDSCH grant) based on the channel state feedback or based on the adjusted quantity of SRSs, (for example, one or more SRS-ASs), and the base station 110 may transmit using the determined configuration. In this case, based on the adjusted rank being less than the measured rank and the adjusted SRSs corresponding to the adjusted rank, the downlink transmissions using the determined configuration are throttled relative to if the downlink transmissions using a configuration corresponding to the measured rank.

Figure 6:
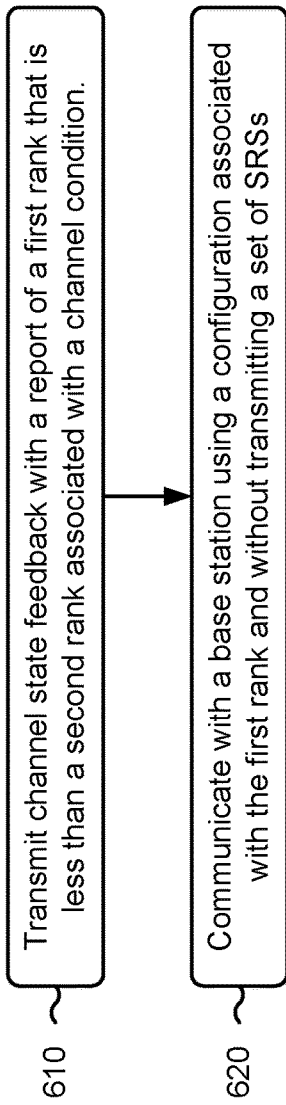
FIGS. 6 and 7 are diagrams illustrating example processes performed, for example, by a UE.

FIG. 6 is a diagram illustrating an example process 600 performed, for example, by a UE. The process 600 is an example where the UE (for example, the UE 120) performs operations associated with SRS transmission in downlink throttling scenarios.

As shown in FIG. 6, in some aspects, the process 600 may include transmitting channel state feedback with a report of a first rank that is less than a second rank associated with a channel condition (block 610). For example, the UE (such as by using communication manager 140 or transmission component 804, depicted in FIG. 8) may transmit channel state feedback with a report of a first rank that is less than a second rank associated with a channel condition.

As shown in FIG. 6, in some aspects, the process 600 may include communicate with a base station using a configuration associated with the first rank and without a set of SRSs (block 620). For example, the UE (such as by using communication manager 140 or adjustment component 808, depicted in FIG. 8) may communicate with a base station using a configuration associated with the first rank and without transmitting a set of SRSs (for example, a set of AS-SRSs) associated with an SRS resource set configured for monitoring by a base station (for example, according to one of the mechanisms referred to with regard to FIG. 3). In some aspects, the UE may communicate with the base station using a configuration associated with the first rank and without (transmitting) an intervening set of SRSs (for example, an intervening set of AS-SRSs).

The process 600 may include additional aspects, such as any single aspect or any combination of aspects described in connection with the process 600 or in connection with one or more other processes described elsewhere herein.

In a first additional aspect, the process 600 includes measuring one or more signals, associated with the second rank, on a channel; and generating channel state feedback including the first rank based on measuring the one or more signals.

In a second additional aspect, alone or in combination with the first aspect, the process 600 includes receiving an indication that a temperature threshold is satisfied, and where transmitting the channel state feedback with the report of the first rank includes transmitting the channel state feedback with the report of the first rank based on receiving the indication that the temperature threshold is satisfied.

In a third additional aspect, alone or in combination with one or more of the first and second aspects, the temperature threshold is associated with a junction temperature or a skin temperature.

In a fourth additional aspect, alone or in combination with one or more of the first through third aspects, communicating with the base station includes receiving a grant of a set of PDSCH resources associated with the configuration and without the set of SRS.

In a fifth additional aspect, alone or in combination with one or more of the first through fourth aspects, the process 600 includes refraining from transmission of a set of SRSs based on transmitting the channel state feedback with the report of the first rank.

In a sixth additional aspect, alone or in combination with one or more of the first through fifth aspects, the set of SRSs is a set of AS-SRSs.

Although FIG. 6 shows example blocks of the process 600, in some aspects, the process 600 may include additional blocks, fewer blocks, different blocks, or differently arranged blocks than those depicted in FIG. 6. Additionally, or alternatively, two or more of the blocks of the process 600 may be performed in parallel.

Figure 7:
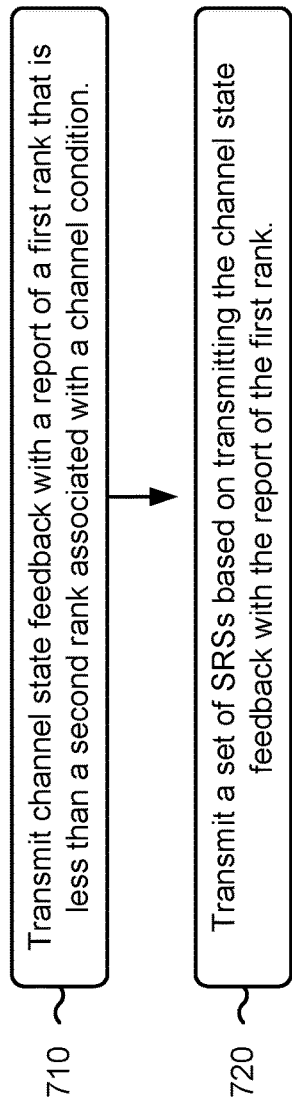
Figure 7:

FIG. 7 is a diagram illustrating an example process 700 performed, for example, by a UE. The process 700 is an example where the UE (for example, UE 120) performs operations associated with SRS transmission in downlink throttling scenarios.

As shown in FIG. 7, in some aspects, the process 700 may include transmitting channel state feedback with a report of a first rank that is less than a second rank associated with a channel condition (block 710). For example, the UE (such as by using communication manager 140 or transmission component 804, depicted in FIG. 8) may transmit channel state feedback with a report of a first rank that is less than a second rank associated with a channel condition.

As shown in FIG. 7, in some aspects, the process 700 may include transmitting a set of SRSs using a configuration associated with the first rank (block 720). For example, the UE (such as by using communication manager 140 or transmission component 804, depicted in FIG. 8) may transmit a set of SRSs (for example, a set of AS-SRSs) with a configuration associated with the first rank.

The process 700 may include additional aspects, such as any single aspect or any combination of aspects described in connection with the process 700 or in connection with one or more other processes described elsewhere herein.

In a first additional aspect, the configuration includes a quantity of configured SRS resources on which the set of SRSs is transmitted.

In a second additional aspect, alone or in combination with the first aspect, the process 700 includes measuring one or more signals, associated with the second rank, on a channel; and generating channel state feedback including the first rank based on measuring the one or more signals.

In a third additional aspect, alone or in combination with one or more of the first and second aspects, the process 700 includes receiving an indication that a temperature threshold is satisfied, and where transmitting the channel state feedback includes transmitting the channel state feedback based on receiving the indication that the temperature threshold is satisfied.

In a fourth additional aspect, alone or in combination with one or more of the first through third aspects, the temperature threshold is associated with junction temperature or a skin temperature.

In a fifth additional aspect, alone or in combination with one or more of the first through fourth aspects, transmitting the set of SRSs includes transmitting the set of SRSs using one or more configured SRS resources based on receiving the indication that the temperature threshold is satisfied.

In a sixth additional aspect, alone or in combination with one or more of the first through fifth aspects, the process 700 includes communicating with a base station using the configuration associated with the first rank.

In a seventh additional aspect, alone or in combination with one or more of the first through sixth aspects communicating with the base station includes receiving a grant of a set of PDSCH resources associated with the configuration.

In an eighth additional aspect, alone or in combination with one or more of the fifth through seventh aspects, the set of SRSs is a set of AS-SRSs.

Although FIG. 7 shows example blocks of the process 700, in some aspects, the process 700 may include additional blocks, fewer blocks, different blocks, or differently arranged blocks than those depicted in FIG. 7. Additionally, or alternatively, two or more of the blocks of the process 700 may be performed in parallel.

Figure 8:
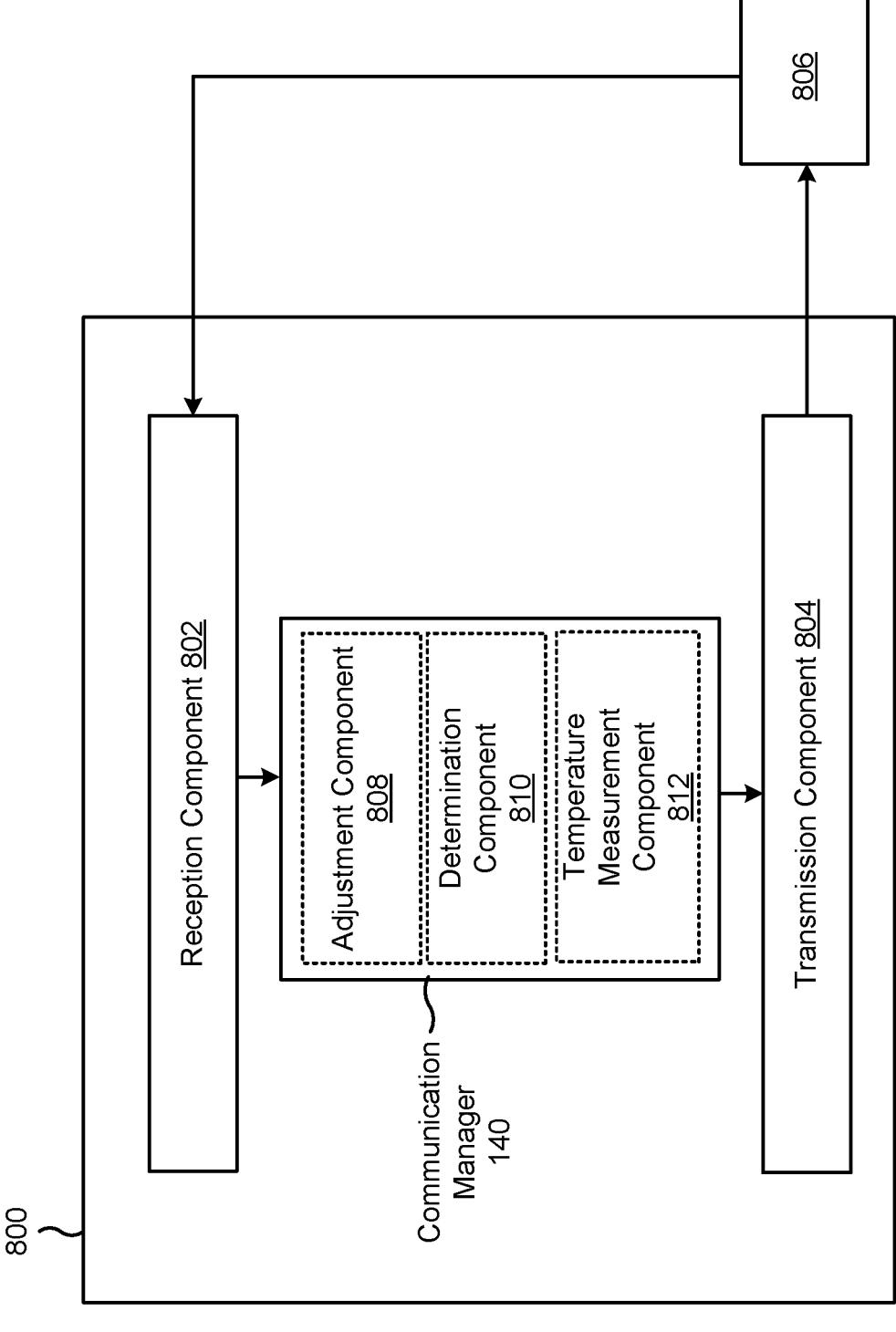
FIG. 8 is a block diagram of an example apparatus for wireless communication.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of an adjustment component 808, a determination component 810, or a temperature measurement component 812, among other examples.

In some aspects, the apparatus 800 may be configured to perform one or more operations described herein in connection with FIGS. 4-5. Additionally, or alternatively, the apparatus 800 may be configured to perform one or more processes described herein, such as process 600 of FIG. 6, process 700 of FIG. 7, or a combination thereof. In some aspects, the apparatus 800 or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

In some aspects, the reception component 802 or the transmission component 804 may be a component of a processing system. For example, a processing system of the apparatus 800 may refer to a system including the various other components or subcomponents of the apparatus 800.

The processing system of the apparatus 800 may interface with other components of the apparatus 800, and may process information received from other components (such as inputs or signals), output information to other components, etc. For example, a chip or modem of the apparatus 800 may include a processing system, the reception component 802 to receive or obtain information, and the transmission component 804 to output, transmit or provide information. In some cases, the reception component 802 may refer to an interface between the processing system of the chip or modem and a receiver, such that the apparatus 800 may receive information or signal inputs, and the information may be passed to the processing system. In some cases, the transmission component 804 may refer to an interface between the processing system of the chip or modem and a transmitter, such that the apparatus 800 may transmit information output from the chip or modem. A person having ordinary skill in the art will readily recognize that the second interface also may obtain or receive information or signal inputs, and the first interface also may output, transmit or provide information.

The transmission component 804 may transmit channel state feedback with a report of a first rank that is less than a second rank associated with a channel condition. The transmission component 804 or the reception component 802 may communicate with a base station using a configuration associated with the first rank and without a set of SRSs. The adjustment component 808 may cause the transmission component 804 to refrain from transmission of a set of SRSs based on the transmission component 804 transmitting the channel state feedback with the report of the first rank. The adjustment component 808 may adjust or cause the transmission component 804 to adjust a reported rank, a reported CQI, channel state feedback, or a quantity of resources used for SRS transmission, among other examples. The reception component 802 may receive one or more signals on a channel. The determination component 810 may measure one or more signals, associated with the second rank, on a channel and may generate channel state feedback including the first rank based on measuring the one or more signals. The reception component 802 may receive an indication that a temperature threshold is satisfied. The transmission component 804 or the reception component 802 may receive a grant of a set of PDSCH resources associated with the configuration and without the set of SRSs.

The transmission component 804 may transmit channel state feedback with a report of a first rank that is less than a second rank associated with a channel condition. The transmission component 804 may transmit a set of SRSs using a configuration associated with the first rank. The transmission component 804 or the reception component 802 may communicate with a base station using the configuration associated with the first rank. The reception component 802 may receive a grant of a set of PDSCH resources associated with the configuration. The reception component 802 may measure one or more signals, associated with the second rank, on a channel. The determination component 810 may generate channel state feedback including the first rank based on measuring the one or more signals. The reception component 802 may receive an indication that a temperature threshold is satisfied. The temperature measurement component 812 may measure a temperature (for example, of the apparatus 800). In another example, another type of component may be used to perform or obtain a measurement associated with downlink throttling, such as a power level measurement component.

The following provides an overview of some Aspects of the present disclosure:

Aspect 1: A method of wireless communication performed by an apparatus of a UE, including transmitting channel state feedback with a report of a first rank that is less than a second rank associated with a channel condition; and communicating with a base station using a configuration associated with the first rank and without a set of SRSs.

Aspect 2: The method of Aspect 1, where communicating with the base station includes receiving a grant of a set of PDSCH resources associated with the configuration and without the set of SRSs.

Aspect 3: The method of any of Aspects 1 to 2, further including refraining from transmission of the set of SRSs based on transmitting the channel state feedback with the report of the first rank.

Aspect 4: The method of any of Aspects 1 to 3, further including measuring one or more signals, associated with the second rank, on a channel; and generating channel state feedback including the first rank based on measuring the one or more signals.

Aspect 5: The method of any of Aspects 1 to 4, further including receiving an indication that a temperature threshold is satisfied; and where transmitting the channel state feedback with the report of the first rank includes transmitting the channel state feedback with the report of the first rank based on receiving the indication that the temperature threshold is satisfied.

Aspect 6: The method of Aspect 5, where the temperature threshold is associated with a junction temperature or a skin temperature.

Aspect 7: The method of any of Aspects 1 to 6, where the set of SRSs is a set of AS-SRSs.

Aspect 8: A method of wireless communication performed by an apparatus of a UE, including transmitting channel state feedback with a report of a first rank that is less than a second rank associated with a channel condition; and transmitting a set of SRSs using a configuration associated with the first rank.

Aspect 9: The method of Aspect 8, further including communicating with a base station using the configuration associated with the first rank.

Aspect 10: The method of any of Aspects 8 to 9, where communicating with the base station includes receiving a grant of a set of PDSCH resources associated with the configuration.

Aspect 11: The method of any of Aspects 8 to 10, where the configuration includes a quantity of configured SRS resources on which the set of SRSs is transmitted.

Aspect 12: The method of any of Aspects 8 to 11, further including measuring one or more signals, associated with the second rank, on a channel; and generating channel state feedback including the first rank based on measuring the one or more signals.

Aspect 13: The method of any of Aspects 8 to 12, further including receiving an indication of that a temperature threshold is satisfied; and where transmitting the channel state feedback includes transmitting the channel state feedback based on receiving the indication that the temperature threshold is satisfied.

Aspect 14: The method of Aspect 13, where the temperature threshold is associated with a junction temperature or a skin temperature.

Aspect 15: The method of any of Aspects 13 to 14, where transmitting the set of SRSs includes transmitting the set of SRSs using one or more configured SRS resources based on receiving the indication that the temperature threshold is satisfied.

Aspect 16: The method of any of Aspects 8 to 15, where the set of SRSs is a set of AS-SRSs.

Aspect 17: An apparatus for wireless communication at a device, including a processor; memory coupled with the processor; and instructions stored in the memory and executable by the processor to cause the apparatus to perform the method of one or more of Aspects 1 to 7.

Aspect 18: A device for wireless communication, including a memory and one or more processors coupled to the memory, the one or more processors configured to perform the method of one or more of Aspects 1 to 7.

Aspect 19: An apparatus for wireless communication, including at least one means for performing the method of one or more of Aspects 1 to 7.

Aspect 20: A non-transitory computer-readable medium storing code for wireless communication, the code including instructions executable by a processor to perform the method of one or more of Aspects 1 to 7.

Aspect 21: A non-transitory computer-readable medium storing a set of instructions for wireless communication, the set of instructions including one or more instructions that, when executed by one or more processors of a device, cause the device to perform the method of one or more of Aspects 1 to 7.

Aspect 22: An apparatus for wireless communication at a device, including a processor; memory coupled with the processor; and instructions stored in the memory and executable by the processor to cause the apparatus to perform the method of one or more of Aspects 8 to 16.

Aspect 23: A device for wireless communication, including a memory and one or more processors coupled to the memory, the one or more processors configured to perform the method of one or more of Aspects 8 to 16.

Aspect 24: An apparatus for wireless communication, including at least one means for performing the method of one or more of Aspects 8 to 16.

Aspect 25: A non-transitory computer-readable medium storing code for wireless communication, the code including instructions executable by a processor to perform the method of one or more of Aspects 8 to 16.

Aspect 26: A non-transitory computer-readable medium storing a set of instructions for wireless communication, the set of instructions including one or more instructions that, when executed by one or more processors of a device, cause the device to perform the method of one or more of Aspects 8 to 16.

Aspect 27: An apparatus for wireless communications, comprising means configured for executing the method of any one of aspects 1 to 7 or 8 to 16.

Aspect 28: A computer program comprising program instructions which, when the program is executed by a computer, cause the computer to carry out the method of any one of aspects 1 to 7 or 8 to 16.

The foregoing disclosure provides illustration and description but is not intended to be exhaustive or to limit the aspects to the precise forms disclosed. Modifications and variations may be made in light of the disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A user equipment (UE) for wireless communication, comprising:

a processing system that includes one or more processors and one or more code-storing memories coupling with the one or more processors, the processing system configured to cause the UE to:

transmit a channel state feedback (CSF) report that identifies an adjusted rank that is lower than a measured rank associated with a channel condition; and communicate with a network entity using a configuration based on the adjusted rank without an antenna switching (AS) sounding reference signal (SRS) (SRS-AS) transmission.

2. The UE of claim 1, wherein the processing system is further configured to cause the UE to:

perform one or more channel measurements; and identify or assign the measured rank to a channel based on the one or more channel measurements.

3. The UE of claim 1, wherein the channel condition is associated with downlink throttling.

4. The UE of claim 1, wherein the processing system, to communicate with the network entity using the configuration based on the adjusted rank without the SRS-AS transmission, is configured to cause the UE to:

receive a physical downlink shared channel (PDSCH) without the SRS-AS transmission.

5. The UE of claim 1, wherein the processing system is further configured to cause the UE to:

detect or identify that a temperature value exceeds a threshold; and enable downlink throttling when the temperature value exceeds the threshold.

6. The UE of claim 1, wherein the processing system is further configured to cause the UE to:

detect or identify that a temperature value exceeds a threshold; and generate the adjusted rank in association with the temperature value exceeding the threshold.

7. A method of wireless communication performed by a user equipment (UE), comprising:

transmitting a channel state feedback (CSF) report that identifies an adjusted rank that is lower than a measured rank associated with a channel condition; and communicating with a network entity using a configuration based on the adjusted rank without an antenna switching (AS) sounding reference signal (SRS) (SRS-AS) transmission.

8. The method of claim 7, further comprising:

performing one or more channel measurements; and identifying or assigning the measured rank to a channel based on the one or more channel measurements.

9. The method of claim 7, wherein the channel condition is associated with downlink throttling.

10. The method of claim 7, wherein communicating with the network entity using the configuration based on the adjusted rank without the SRS-AS transmission comprises:

receiving a physical downlink shared channel (PDSCH) without the SRS-AS transmission.

11. The method of claim 7, further comprising:

detecting or identifying that a temperature value exceeds a threshold; and enabling downlink throttling when the temperature value exceeds the threshold.

12. The method of claim 7, further comprising:

detecting or identifying that a temperature value exceeds a threshold; and generating the adjusted rank in association with the temperature value exceeding the threshold.

13. A user equipment (UE) for wireless communication, comprising:

a processing system that includes one or more processors and one or more code-storing memories coupling with the one or more processors, the processing system configured to cause the UE to:

transmit a channel state feedback (CSF) report that identifies an adjusted rank that is lower than a measured rank associated with a channel condition; and transmit one or more antenna switching (AS) sounding reference signal (SRS) (SRS-AS) transmissions using a quantity of antennas corresponding to the adjusted rank.

14. The UE of claim 13, wherein the processing system is further configured to cause the UE to:

perform one or more channel measurements; and identify or assign the measured rank to a channel based on the one or more channel measurements.

15. The UE of claim 13, wherein the processing system is further configured to cause the UE to:

communicate with a network entity using a configuration that is based on the adjusted rank.

16. The UE of claim 13, wherein the channel condition is associated with downlink throttling.

17. The UE of claim 13, wherein the processing system is further configured to cause the UE to:

detect or identify that a temperature value exceeds a threshold; and generate the adjusted rank in association with the temperature value exceeding the threshold.

18. A method of wireless communication performed by a user equipment (UE), comprising:

transmitting a channel state feedback (CSF) report that identifies an adjusted rank that is lower than a measured rank associated with a channel condition; and transmitting one or more antenna switching (AS) sounding reference signal (SRS) (SRS-AS) transmissions using a quantity of antennas corresponding to the adjusted rank.

19. The method of claim 18, further comprising:

performing one or more channel measurements; and identifying or assigning the measured rank to a channel based on the one or more channel measurements.

20. The method of claim 18, further comprising:

communicating with a network entity using a configuration that is based on the adjusted rank.

21. The method of claim 18, wherein the channel condition is associated with downlink throttling.

22. The method of claim 18, further comprising:

detecting or identifying that a temperature value exceeds a threshold; and generating the adjusted rank in association with the temperature value exceeding the threshold.

23. The UE of claim 1, wherein the processing system, to transmit the CSF report, are configured to cause the UE to:

transmit the CFS report with an adjusted channel quality indicator (CQI).

24. The UE of claim 1, wherein the processing system, to transmit the CSF report, are configured to cause the UE to:

transmit the CFS report without an adjusted channel quality indicator (CQI).

25. The method of claim 7, wherein the CSF report is transmitted with an adjusted channel quality indicator (CQI).

26. The method of claim 7, wherein the CSF report is transmitted without an adjusted channel quality indicator (CQI).

27. The UE of claim 13, wherein the processing system, to transmit the CSF report and the one or more SRS-AS transmissions, are configured to cause the UE to:

transmit the CSF report and the one or more SRS-AS transmissions in concurrent, separate communications.

28. The UE of claim 13, wherein the processing system, to transmit the CSF report and the one or more SRS-AS transmissions, are configured to cause the UE to:

transmit the CSF report and the one or more SRS-AS transmissions in a single communication.

29. The method of claim 18, wherein the CSF report and the one or more SRS-AS transmissions are transmitted in concurrent, separate communications.

30. The method of claim 18, wherein the CSF report and the one or more SRS-AS transmissions are transmitted in a single communication.

\* \* \* \* \*